US007462772B2

(12) United States Patent
Salter

(10) Patent No.: US 7,462,772 B2
(45) Date of Patent: Dec. 9, 2008

(54) MUSIC COMPOSITION SYSTEM AND METHOD

(76) Inventor: Hal C. Salter, 11510B Valencia Dr., Suite A, Seffner, FL (US) 33584

( * ) Notice: Subject to any disclaimer, the term of this patent is extended or adjusted under 35 U.S.C. 154(b) by 32 days.

(21) Appl. No.: 11/669,103

(22) Filed: Jan. 30, 2007

(65) Prior Publication Data

US 2007/0175317 A1 Aug. 2, 2007

Related U.S. Application Data

(60) Provisional application No. 60/764,235, filed on Jan. 31, 2006, provisional application No. 60/758,885, filed on Jan. 13, 2006.

(51) Int. Cl.
*G09B 15/00* (2006.01)
*G09B 15/02* (2006.01)
*G10H 1/00* (2006.01)

(52) U.S. Cl. ......................... 84/477 R; 84/609; 84/611; 84/483.2

(58) Field of Classification Search ....................... None
See application file for complete search history.

(56) References Cited

U.S. PATENT DOCUMENTS

| | | | | |
|---|---|---|---|---|
| 5,886,273 | A * | 3/1999 | Haruyama | 84/478 |
| 6,204,441 | B1 * | 3/2001 | Asahi et al. | 84/470 R |
| 2003/0037664 | A1 * | 2/2003 | Comair et al. | 84/609 |
| 2003/0131715 | A1 * | 7/2003 | Georges | 84/609 |
| 2003/0167902 | A1 * | 9/2003 | Hiner et al. | 84/477 R |
| 2004/0123724 | A1 * | 7/2004 | Funaki | 84/478 |
| 2004/0173082 | A1 * | 9/2004 | Bancroft et al. | 84/612 |

* cited by examiner

*Primary Examiner*—Marlon T Fletcher
(74) *Attorney, Agent, or Firm*—Advantia Law Group; Michael W. Starkweather; Jason P. Webb

(57) ABSTRACT

A system for music composition including: a display module configured to display data; a graphical user interface module in communication with the music data control module, and configured to interface with a user; a music data control module in communication with the display module and with the graphical user interface module, and configured to control music data; and a music data source module in communication with the music data control module and providing a first value.

20 Claims, 9 Drawing Sheets

MUSIC COMPOSITION SYSTEM AND METHOD

CROSS-REFERENCE TO RELATED APPLICATIONS

This invention claims priority, under 35 U.S.C. § 120, to the U.S. Provisional Patent Application No. 60/764,235 filed on Jan. 31, 2006 and Provisional Patent Application No. 60/758,885 filed on Jan. 13, 2006, which are incorporated by reference herein.

BACKGROUND OF THE INVENTION

1. Field of the Invention

The present invention relates to methods and systems of music performing and composition, specifically to methods and systems for playing, creating, composing, displaying, and editing music data.

2. Description of the Related Art

Music composition provides an opportunity for creative expression. People have taken some advantage of this opportunity from the beginning of recorded time. Through music composition we express our excitement, sorrow, joy, devotion, patriotism, love, delight, etc. Many of our favorite songs are a culmination of significant historical events and thereby represent an expression of history. Accordingly, musical composition has been and continues to be an important human endeavor.

While bare-bones musical composition is available to anybody with a memory and a rhythm making device, expression is easier with tools and is more easily understood with a language. Accordingly, various musical notations have been developed over time to help us record and communicate our expressions. Further, many tools have been developed to further automate or otherwise facilitate musical composition.

In particular, with the advent of the computer, musical notation software was developed to assist in writing music. These packages have generally included some assistance in selecting note pitch and timing for a plurality of notes and associating them together as a song. Electronics and computer-related technologies such as MIDI (Musical Instrument Digital Interface) have been increasingly applied to musical instrument over the years; thus greatly enhancing the ability to create, edit, and play musical compositions.

While such technology has greatly enhanced the ability to create, play, and store music compositions, many of the current systems and methods utilizing these technologies are complex, expensive, and may require a user to have substantial musical experience and training. Additionally, while some systems and methods are adept and proficient in one area of music composition, those same systems and methods may be inadequate in other areas. For example, one system may excel in playing and recording music compositions, while being inadequate and inept in areas of creating and editing music compositions, and vice versa. Therefore, people have continually worked to produce different and/or better systems and methods of enhancing musical composition. Examples include but are not limited to the references described below, which references are incorporated by reference herein:

U.S. Pat. No. 6,417,438, issued to Haruyama et al., discloses a general transposition setting device for setting a transposition for an entire musical instrument, there is also provided an automatic-performance transposition setting device for optionally setting a transposition value for automatic performance. Automatic performance data is transposed in accordance with the transposition value set by the automatic-performance transposition setting device and a visual performance guide display based on the transposed automatic performance data is provided via a key display as an automatic performance process is advanced on a desired music piece. Human player depresses keys in accordance with the visual performance guide display so that tones corresponding to the depressed keys are generated. The transposition set via the automatic-performance transposition setting device does not act on the tones manually performed by the player's key depression operation, and only the transposition set via the general transposition setting device becomes effective on such manually-performed tones.

U.S. Pat. No. 6,798,427, issued to Suzuki et al., discloses a score of a given music piece is visually shown on a display. When a particular style of rendition is to be imparted to a desired note on the musical score, a user selects a desired one of style-of-rendition icons and designates a desired note location on the musical score as a pasting location of the selected style-of-rendition icon. Thus, the selected style-of-rendition icon is shown on the display in corresponding relation to the designated pasting location. The style-of-rendition icons are appropriately associated with sets of style-of-rendition parameters, so that performance data, i.e., tonal characteristics of the note, corresponding to the pasted location of the style-of-rendition icon is controlled, in accordance with the style-of-rendition parameters corresponding to the pasted style-of-rendition icon on the musical score, to thereby achieve a performance in the style of rendition corresponding to the pasted icon. On the display screen, at least one-row of style-of-rendition display areas are set in parallel relation to a musical score display area, and the pasted style-of-rendition icon is shown any one of the style-of-rendition display areas. Further, on the display screen, the style-of-rendition icon pasted to the desired note location is designated for editing of corresponding style-of-rendition information.

U.S. Pat. No. 6,977,335, issued to Georges et al, discloses a method for electronically generating a song wherein at least one parameter value representing a range of note pitch values associated with a musical instrument is accessed and program instructions are executed. One or more music composition algorithms are applied to musical data to generate a musical note data unit associated with the musical instrument. A musical note data unit is compared to the parameter value to determine whether the musical note data unit is within the range of note pitch values. In the event that the musical data unit is not within the range of note pitch values, the musical data unit is modified to be within the range of note pitch values. In the step of receiving user input associated with the musical instrument, the range of note pitch values may be modified in accordance with user input. In accordance with the claimed invention, methods for creating, modifying, interacting with and playing musical compositions may be provided.

U.S. Patent Application Publication No.: 2004/0177745, by Kayama, Hiraku, discloses a plurality of types of additional attribute data included in note data, a selection section selects one or more of the plurality of types of additional attribute data. For a plurality of the note data, a display section displays pictorial figures or the like representative of the contents of the additional attribute data of the types selected by the selection section, in proximity to pictorial figures or the like representative of pitches and sounding periods of the note data. The display section also displays pictorial figures or the like indicative of the contents of the additional attribute data, at positions and in sizes corresponding to periods or timing when musical expressions or the like indicated by the additional attribute data are to be applied.

U.S. Patent Application Publication No.: 2004/0094017, by Suzuki et al, discloses a performance data editing system is actualized by a computer system (or electronic musical instrument) which is equipped with a display and a mouse. The system initially provides a score window containing various types of execution icon layers onto which execution icons (representing musical symbols such as bend-up/down, grace-up/down, dynamics, glissando, tremolo) are attached and arranged in conformity with a progression of a musical tune on a screen of the display. Each of the layers is independently controlled in response to various commands such as display-on, small-scale display, display-off and vertical rearrangement. The system allows a user (or music editor) to select desired execution icons from an icon select palette that provides lists of execution icons which are registered in advance. In addition, the system also allows the user to modify parameters of a specific icon which is selected from among the execution icons attached onto the score window. That is, the user opens an icon modify window to change parameters of the specific icon with the mouse. Further, the system provides the user with a simple operation for deletion of execution-related data from performance data. That is, when the user performs drag-and-drop operations on a certain execution icon to move it outside of a prescribed display area (e.g., layer window) of the score window, the system automatically deletes the corresponding execution-related data from the performance data.

The inventions heretofore known suffer from a number of disadvantages which include: difficulty of use, especially for younger users; a high learning curve; failure to provide an intuitive interface; including obstacles that limit creative expression; and failing to provide sufficient guidance and/or skill enhancing effects.

What is needed is a method and/or system that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available composition methods and systems. Accordingly, the present invention has been developed to provide a composition method and system which enables users of all musical skill levels a forum to express creativity in a skillful way. In addition to providing simple, fun, and creative ways to create, edit, and play music compositions; the present invention also teaches and assists users in music composition.

In one embodiment, there is a method and/or a computer readable storage medium comprising computer readable program code configured to execute on a processor for music composition. The program code may be configured to and/or execute a method for displaying a composition object according to a first music value, wherein the first value includes a musical event; displaying a first indicator wherein the first indicator describes the first value; displaying a second indicator, wherein the second indicator describes the first value; selecting the composition object; graphically altering the first indicator; changing the first value to a second value; and/or graphically altering the second indicator.

In another embodiment, there is a system for music composition. The system may comprise: a display module configured to display data; a graphical user interface module in communication with the music data control module, and configured to interface with a user; a music data control module in communication with the display module and with the graphical user interface module, and configured to control music data. The music data control module may comprises instructions for: displaying a composition object through the display module, wherein the composition object displays a first value in a first mode and a second value in a second mode; displaying a first indicator in association with the composition object, in communication with the graphical user interface module, and wherein a transition of the composition object between the first mode and the second mode is actuated by graphically altering the first indicator through the graphical user interface module; and/or displaying a second indicator in association with the composition object, wherein a graphical change in the second indicator occurs in association with the transition of the composition object between the first mode and the second mode. The system may additionally include a music data source module in communication with the music data control module and providing the first value.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawing(s). Understanding that these drawing(s) depict only typical embodiments of the invention and are not therefore to be considered to be limiting of its scope, the invention will be described and explained with additional specificity and detail through the use of the accompanying drawing(s), in which.

DETAILED DESCRIPTION OF THE INVENTION

Figure 1:
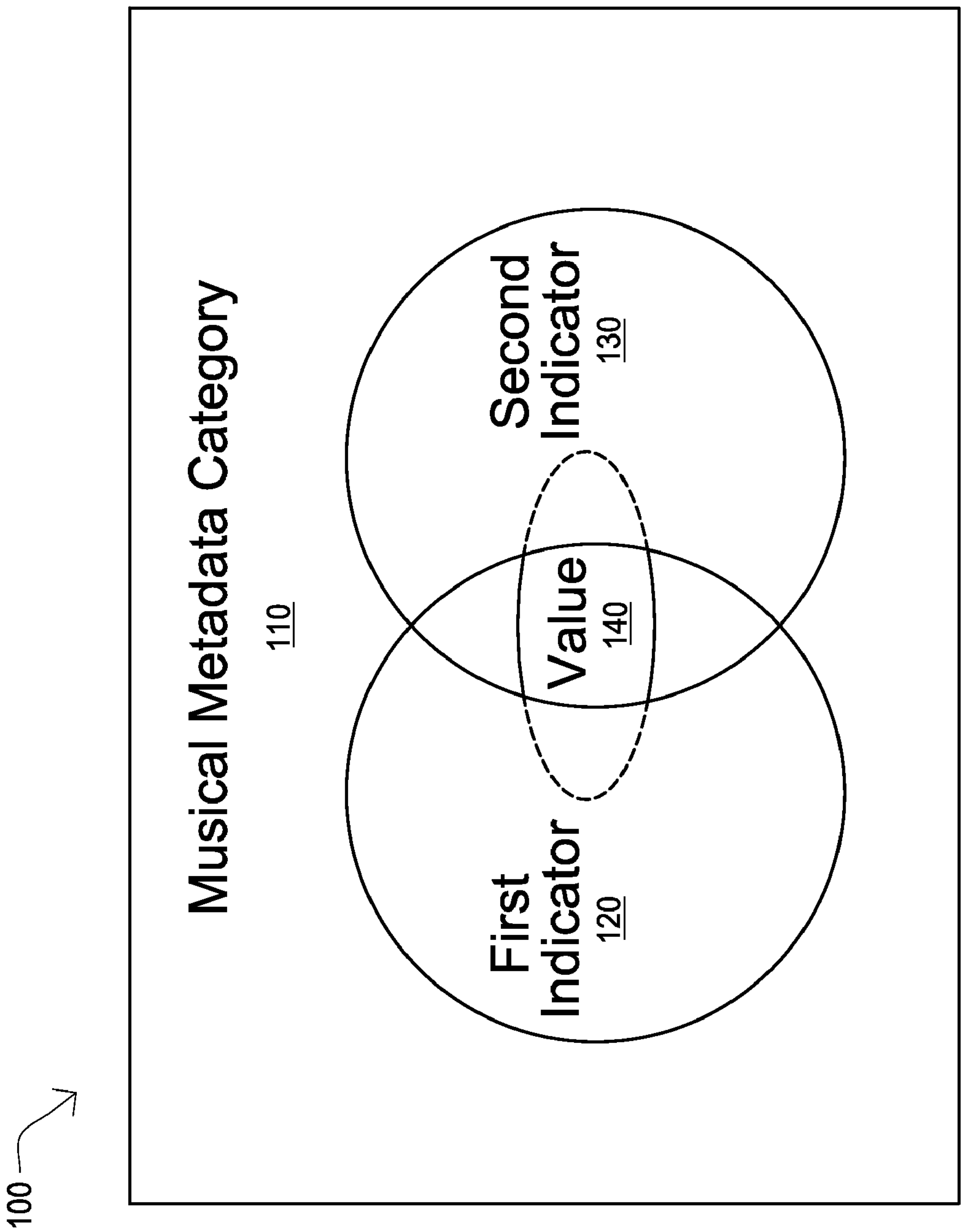
FIG. 1 is a relational diagram illustrating a system of musical composition according to one embodiment of the invention.

For the purposes of promoting an understanding of the principles of the invention, reference will now be made to the exemplary embodiments illustrated in the drawing(s), and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

As used herein, "comprising," "including," "containing," "is," "are," "characterized by," and grammatical equivalents thereof are inclusive or open-ended terms that do not exclude additional un-recited elements or method steps. "Comprising" is to be interpreted as including the more restrictive terms "consisting of" and "consisting essentially of."

MIDI defines an interface for exchanging information between electronic musical instruments, computers, sequencers, lighting controllers, mixers, and tape recorders as discussed in MIDI Manufacturers Association publication entitled, MIDI 1.0 Detailed Specification (1990). MIDI is extensively used both in the recording studio and in live performances and has had enormous impact in the areas of studio recording and automated control, audio video production and composition. By itself and in conjunction with other media, MIDI plays an integral role in the application of computers to multimedia applications.

In comparison to digital audio, MIDI files take up much less space and the information is symbolic for convenient manipulation and viewing. For example, a typical three minute MIDI file may require 30 to 60 Kilobytes on a disk, whereas a CD quality stereo audio file requires about two hundred Kilobytes per second or 36 Megabytes for three minutes. MIDI data may appear as musical notation, graphical piano-roll, or lists of messages suitable for editing and reassignment to different instruments.

General MIDI has standardized instrument assignments to greatly motivate the multimedia title producer. MIDI input and output ports are used to route time-stamped MIDI packets from one media component to another. MIDI ports act as mailboxes for the communication of MIDI packets across address spaces. Many interesting MIDI applications can be created by connecting media components that contain MIDI ports. For example, a MIDI player and a MIDI interface can be used to play a music device, like an electronic player piano or a guitar, connected to a computer. MIDI packets are sent from the MIDI player to the MIDI interface. The MIDI interface converts the MIDI packets to MIDI data that is sent to the player instrument piano or guitar for playback.

Additionally, certain MIDI files and songs are already broken up into 'tracks' or channels which may be the equivalent of voice, or orchestral parts, or simply the treble and bass clefs. Players are able to select which tracks or combination of tracks are to be included in the game, again this will affect the score as to what percentage of the total song these tracks include. The selection of songs, then number or choice of tracks, and then tempo are the principle ways that the player can determine the level of the game, and the focus of the repetition. This is further taught in U.S. Patent Application No. 2004/0137984, which is incorporated by reference herein.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of programmable or executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module and/or a program of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The various system components and/or modules discussed herein may include one or more of the following: a host server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: show data, participant data; sponsor data; financial institution data; and/or like data useful in the operation of the present invention. As those skilled in the art will appreciate, any computers discussed herein may include an operating system (e.g., Windows NT, 95/98/2000, OS2, UNIX, Linux, Solaris, MacOS, etc.) as well as various conventional support software and drivers typically associated with computers. The computers may be in a home or business environment with access to a network. In an exemplary embodiment, access is through the Internet through a commercially-available web-browser software package.

As set forth in the specification, the system and method of the invention may facilitate the providing information to participants through multiple media sources and may allow the player modules to receive information via similar multiple media sources. The multiple media sources may include, for example, chat room, radio, bulletin board, internet web pages, email, billboards, newsletters, commercials and/or the like. The present invention may be described herein in terms of functional block components, screen shots, optional selections and various processing steps. It should be appreciated that such functional blocks may be realized by any number of hardware and/or software components configured to perform the specified functions.

For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements.

Further, it should be noted that the present invention may employ any number of conventional techniques for data transmission, signaling, data processing, network control, and the like. Still further, the invention may be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

Additionally, many of the functional units and/or modules herein are described as being "in communication" with other functional units and/or modules. Being "in communication" refers to any manner and/or way in which functional units and/or modules, such as, but not limited to, computers, laptop computers, PDAs, modules, and other types of hardware and/or software, may be in communication with each other. Some non-limiting examples include communicating, sending, and/or receiving data and metadata via: a network, a wireless network, software, instructions, circuitry, phone lines, internet lines, satellite signals, electric signals, electrical and magnetic fields and/or pulses, and/or so forth.

As used herein, the term "network" may include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention may be implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997), the contents of which are hereby incorporated by reference.

Music generally includes a plurality of musical events, usually notes, arranged according to a predetermined timing and often including other characteristics such as pitch, attack, duration, etc. These musical events may be stored as data, wherein each event may be accompanied by metadata describing one or more characteristics of the event. Further, musical events may be embodied in musical notation, such as but not limited to standard musical notation; wherein events and their characteristics may be graphically displayed as notes on a page. The notes, the score, key notation, and other visual indicators provide information about these events. This relationship, and how it relates to an embodiment of the present invention, is further described in FIG. 1.

In particular, FIG. 1 is a relational diagram illustrating the system 400 and method 300 of musical composition, according to one embodiment of the invention. There is shown a musical metadata category 110 associated with a first indicator 120 and a second indicator 130 as well as a music value 140. The illustrated indicators 120 and 130 overlap in description and a particular music value 140 is at least partially described by each. This relationship provides for cumulative indication by the indicators 120 and 130, thereby providing more readily accessible information to a user regarding a particular metadata category 110.

In one embodiment, the musical metadata category 110 is a database field enabling description of an event. For example, the category 110 may include pitch information, such as but not limited to: frequency of an event or a note (C, C#, A flat, etc.). Other examples include, but are not limited to: attack (staccato, etc.), duration (half notes, whole notes, etc.), and volume. Such musical metadata provide additional information in how a particular event should sound. This is distinguished from song metadata categories, such as but not limited to key, tempo, and other information on how a collection of events should sound.

In a digital setting, metadata is generally stored in data files and not readily accessible to a user. Accordingly, indicators, usually visual indicators, are included to provide information related to stored metadata values. The illustrated first indicator 120 and second indicator 130 each provide at least some information associated with a metadata value 140. Further, such indicators 120 and 130 include overlapping description, thereby providing cumulative information about the value 140.

In one non-limiting example, a first indicator 120 is a relative position of a note across a display screen representing pitch of an event. More, a non-limiting exemplary second indicator 130 is a color displayed with, or on the note that correlates to a set of note pitches. Accordingly, while the first indicator 120 and the second indicator 130 each provide pitch information, one may provide more or less complete information than the other. In the present example, the first indicator 120 may provide substantially complete information about a pitch value, while the second indicator 130 provides incomplete information about a pitch value, for example, by specifying a chromatic note but not specifying a particular octave (C instead of middle C). However, both indicators 120 and 130 include cumulative pitch information.

In particular, as shown in the figures, the illustrated composition objects 220, 230, and 240 include the first indicator 120, the first indicator 130 showing a composition object 220, 230, and 240 being positioned vertically to indicate timing and horizontally to indicate a pitch associated with the horizontal configuration of the virtual keyboard 210. More, the illustrated composition objects 220, 230, and 240 also demonstrate the second indicator 130, wherein the composition objects 220, 230, and 240 are colored according to a repeating color scheme associated with pitch, wherein the color scheme repeats for each octave of pitch.

Figure 2:
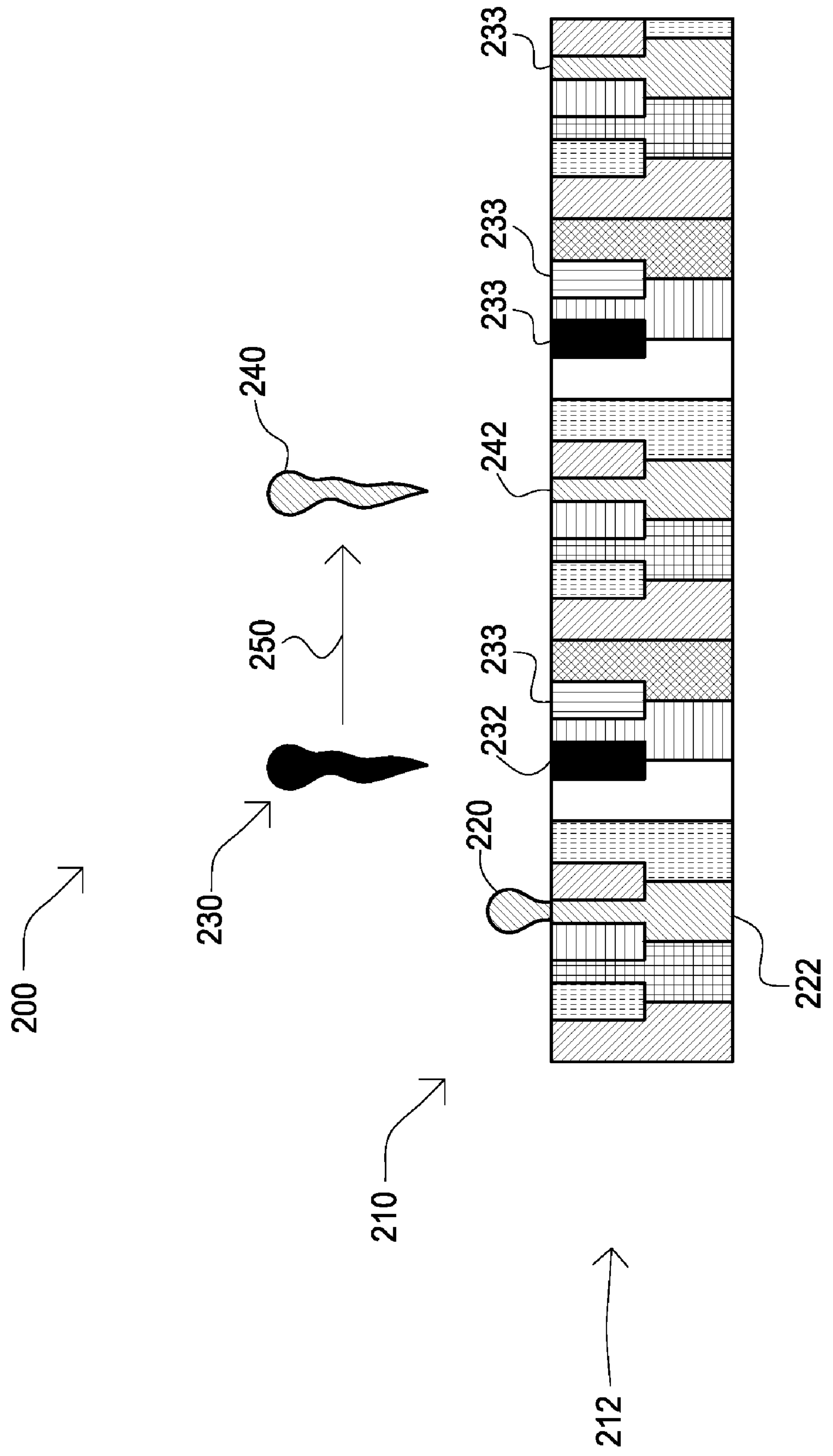
FIG. 2 illustrates an exemplary graphical display according to one embodiment of the invention.

An example of a graphical display 200 showing an application of the present example is shown in FIG. 2. In particular, FIG. 2 illustrates an exemplary graphical display 200, according to one embodiment of the invention. There is shown a virtual keyboard 210 near a bottom 212 of a display 200. More, there are a plurality of composition objects 220, 230, and 240 displayed in relation to the virtual keyboard 210 and/or according to a first music/metadata value 140. The composition objects 220, 230, and 240 represent musical events, music, and/or metadata values 140 and may be represented by and/or embodied by a first indicator 120 and a second indicator 130. In one non-limiting example, the first and second indicators 120, 130 are represented by the position and color of the composition object 220, 230, and 240, respectively. In particular, the illustrated composition objects 220, 230, and 240 include the first indicator 120, the first indicator 120 showing a composition object 220, 230, and 240 being positioned vertically to indicate timing and horizontally to indicate a pitch associated with the horizontal configuration of the virtual keyboard 210. More, the illustrated composition objects 220, 230, and 240 also demonstrate the second indicator 130, wherein the composition objects 220, 230, and 240 are colored according to a repeating color scheme associated with pitch, wherein the color scheme repeats for each octave of pitch.

Figure 3:
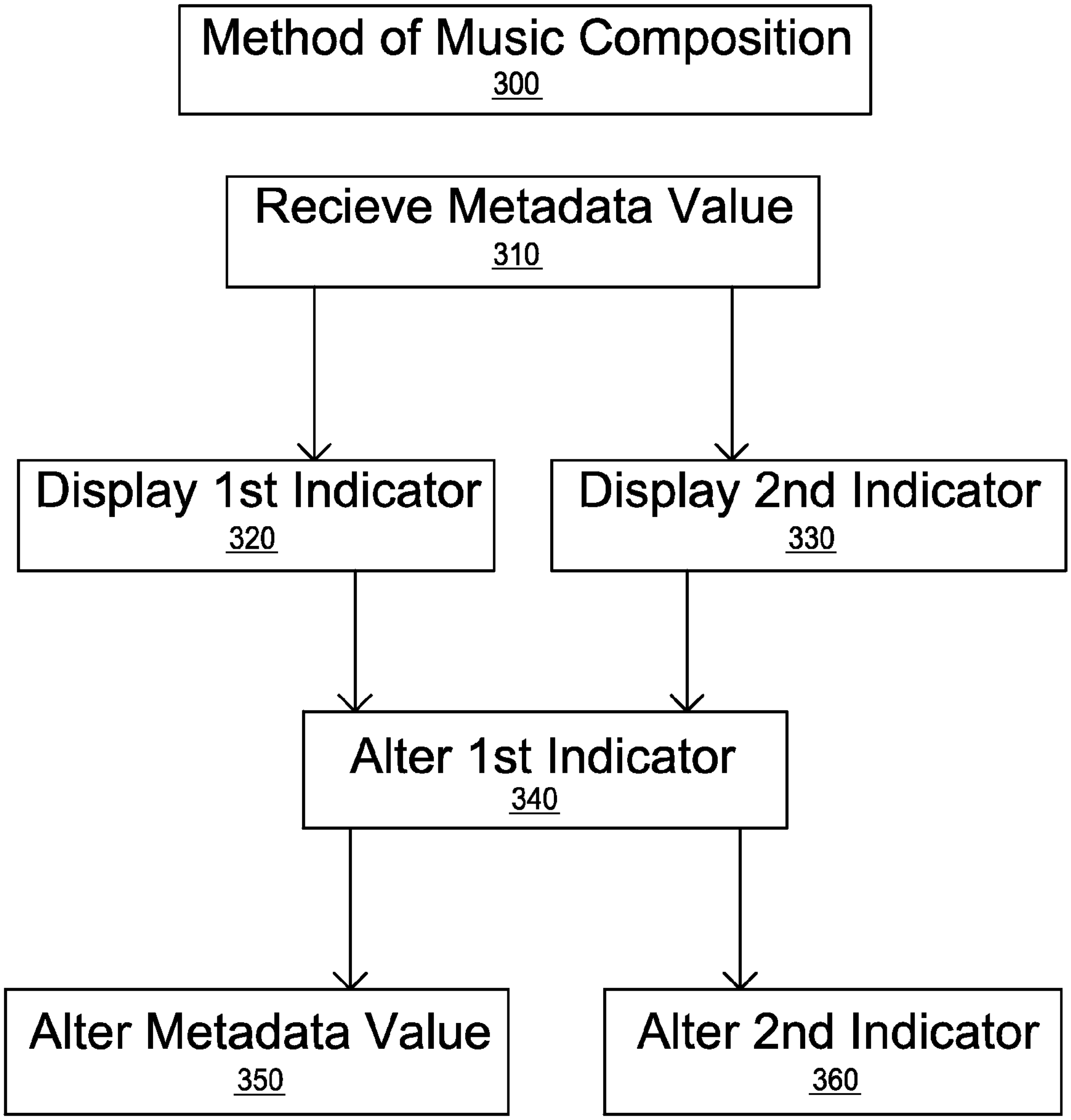
FIG. 3 illustrates a method of musical composition according to one embodiment of the invention.

As shown in FIG. 3, there is a computer readable storage medium comprising computer readable program code configured to execute on a processor for music composition, the program code configured to and/or execute a method 300 for receiving a first music/metadata value 310; displaying a composition object 220, 230, and 240 according to a first music/value 140, displaying a first indicator 320, wherein the first indicator 120 describes the first music/metadata value 140; displaying a second indicator 330, wherein the second indicator 130 describes the first music/metadata value 140; selecting the composition object 220, 230, and 240; graphically altering the first indicator 340; changing and/or altering the first music/metadata value 140 to a second music/metadata value 350; and graphically altering the second indicator 360. The first music/metadata values 140 may include data and/or values associated with any type and/or form of music data contemplated in the art, or as described herein. Some non-limiting examples of music/metadata values 140 may include: pitch; tone; octave; note length and/or duration; attack, such as but not limited staccato; and/or so forth. Additionally, the method may include receiving a one or more, indeed a plurality of music/metadata values 140.

Additionally, as shown in the figures, the program code may be configured to execute a method 300 for displaying a composition object 220, 230, and 240 according to and/or representative of the first music/metadata value 140. The composition object 220, 230, and 240 may take any form and/or be displayed in any manner contemplated in the art. In one non-limiting example, the composition objects 220, 230, and 240 are displayed as eels and/or are serpent shaped. Other non-limiting examples of shapes include: musical notes, flying saucers, rectangular bars, and/or so forth. Additionally, the shape and/or form of the composition object 220, 230, and 240 may be associated with and/or related to a plurality of display backgrounds disposed on the display module 420.

Also shown in the figures, the method 300 includes displaying a first indicator 320 and displaying a second indicator 330. The first indicator 120 and second indicator 130 each describe the first music/metadata value 140. The first indicator 120 and second indicator 130 may be displayed in any form, shape, color and/or include any graphical features as contemplated in the art, or as described herein. Indeed, the first and second indicators 120 and 130 may each describe the first music/metadata value 140 in any manner contemplated in the art, or as herein described. In one non-limiting example, the first indicator 120 describes the first music/metadata value as a position and/or location in orientation to a virtual music instrument 210 on the display module 420. Indeed, the first indicator 120 may be embodied in and/or describe the first music/metadata value 140 in the position of a composition object 220, 230, and 240 relative to the virtual instrument keys 222. Additionally, the first indicator 120 may comprise a virtual instrument keys' 222 position on a virtual music instrument 210; such as but not limited to, the C# virtual key 232 on a virtual keyboard 210.

Also shown in the figures, the second indicator 130 may describe the first music/metadata value 140 as a color and/or color scheme. Additionally, the second indicator 130 may described the first music/metadata value 140 in other ways, such as but not limited to: patterns, a variety of color shading, and/or so forth. The second indicator 130 may be displayed in association with the composition objects 220, 230, and 240, the virtual instrument keys 222 of a virtual music instrument 210, and/or any other manner or form contemplated in the art.

In an additional embodiment, the first and second indicators 120 and 130 each cooperate to describe the first music/metadata value 140.

As shown in the figures, the method 300 additionally includes selecting the composition object 220, 230, and 240. Selecting the displayed composition object 220, 230, and 240 may be accomplished in any manner contemplated in the art. Some non-limiting examples of selecting the composition object 220, 230, and 240 include: clicking, highlighting, moving a computer or mouse cursor over the composition object 220, 230, and 240, and/or so forth.

Also, as shown in the figures, the method 300 and/or program code may include graphically altering the first indicator 340. The first indicator 120 may be graphically altered in any form or manner contemplated in the art, or as described herein. In one non-limiting example, graphically altering the first indicator 120 includes moving and/or transposing the first indicator 120 from one location and/or position relative to a virtual instrument key 222 to another location and/or position relative to a virtual instrument key 222. For example, if the first indicator 130 includes the position of a composition object 230 at the C#virtual instrument key 232; the first indicator 120 is graphically altered by moving the composition object 230 to another virtual instrument key 242, such as the F virtual instrument key 242. Additionally, the first indicator 120 may be graphically altered in changing the length and/or shape of the composition object 220, 230, and 240.

In one embodiment, graphically altering the first indicator 340 may be accomplished by any means contemplated in the art, or as described herein. In one non-limiting example, the first indicator 120 and/or the composition object 220, 230, and 240 associated with the first indicator 120 may be highlighted and/or selected by a computer cursor or mouse and moved, dragged, and/or transposed. In another non-limiting example, the first indicator 120 may be selected, cut, copied, and/or pasted from one first indicator 120, or position, to another first indicator 120, or position.

As shown in the figures, the method 300 and program code includes changing and/or altering the first music/metadata value 140 to a second music/metadata value 350. In an non-limiting example, a first music/metadata value 140 representing the pitch for C#, is changed to a second music value 140 representing the pitch for F. Changing the first music/metadata value 140 to a second music and/or metadata value 350 may be accomplished by any means contemplated in the art. In one non-limiting example, the change from a first music/metadata value 140 to a second music/metadata value 140 occurs automatically and simultaneously upon a user 590 graphically altering the first indicator 350, as described previously. Additionally, if a user 590 desires to change and/or alter the first music/metadata value 140 he or she may accomplish this by graphically altering the first indicator 340 and/or the second indicator 360.

Additionally, as shown in the figures, the method 300 and program code also includes graphically altering the second indicator 360. Graphically altering the second indicator 360 may occur automatically and simultaneously upon the graphical altering of the first indicator 340 and/or changing the first music/metadata value to a second music/metadata value 350. For example, changing the first indicator 120 from a C# position to an F position 340 may not only automatically change the first music/metadata value to a second music/metadata value 350, but may also automatically graphically alter the second indicator 360. In one non-limiting example, the second indicator 130 may be graphically altered from a blue color to a yellow color. The graphical alterations of the second indicator 360 may include any of those contemplated in the art, or herein described. Some non-limiting examples of graphical alterations of the second indicator 360 may include: altering the patterns, colors, shades of colors, lengths, and/or so forth.

Additionally, as shown in the figures, the method and/or program code may include not keying the second indicator 130 to a set of shapes. In not keying the second indicator 130 to a set of shapes, the data and/or program code instructing and/or comprising the second indicator 130 does not include shapes and/or any data associated with shapes. Therefore, in one embodiment, the second indicator 130 may be embodied in or take any form except a shape. A shape, for example, may include a rectangle, a circle, a square, and/or so forth. Rather, the second indicator 130 is embodied in other form without shape, such as but not limited to, colors, color shades, signals, audio signals, and/or so forth.

In another embodiment, the method 300 and/or program code may include converting a music performance to music performance data and/or values. The music performance may be any type and/or kind of musical performance contemplated in the art. In one non-limiting examples, there may be one or more performance modules as contemplated in the art, or as described herein. The one or more performance modules may be in communication and/or connected via a network. Indeed, the music performance data may be embodied in and/or include the first music/metadata value 140.

Additionally, in one embodiment, the method 300 may also include recording the music performance data; playing prerecorded music data; and simultaneously playing the prerecorded music data and the recorded performance data. These features may advantageously enable a user 590 to play a music performance on an instrument with or without prerecorded music accompaniment, convert the performance to music data, and play an audio recording of the users' 590 performance along with the accompaniment.

As shown in the figures, the method 300 and/or program code may also include generating a graphical user interface 200 and 600. The graphical user interface includes a virtual music instrument 210, wherein the virtual music instrument 210 includes a plurality of virtual instrument keys 222, each virtual instrument key 222 corresponding to a key on a performance module. The graphical user interface 200 and 600 may be embodied and/or incorporate as part of any graphical user interface module 440 contemplated in the art. In one non-limiting example, the graphical user interface 200 and 600 is embodied in a display module 420, such as but not limited to a computer monitor 560, video graphics card, and/or video software.

Figure 6:
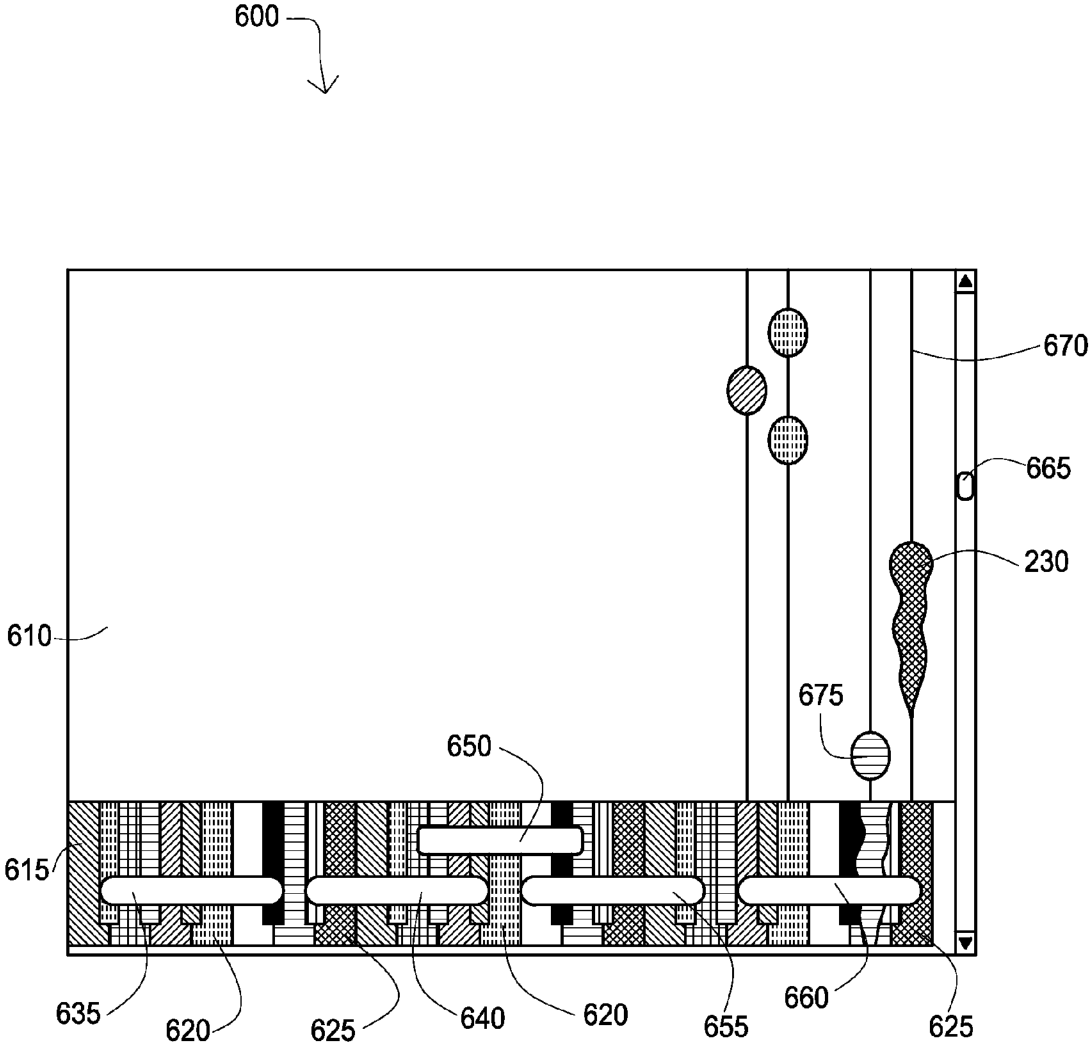
FIG. 6 illustrates an exemplary graphical display, according to one embodiment of the invention.
Figure 7:
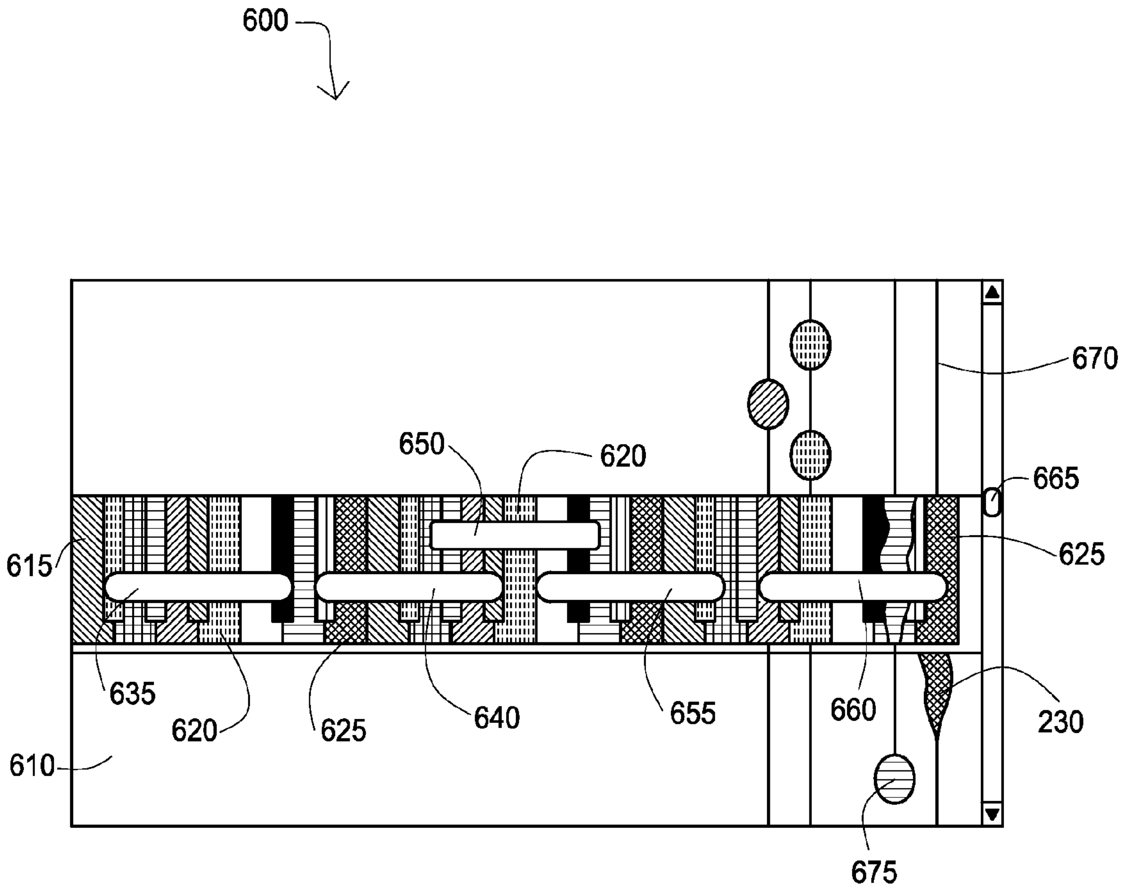
FIG. 7 illustrates an exemplary graphical display, according to one embodiment of the invention.

Further, as shown in the figures, the virtual music instrument 210 includes a plurality of virtual instrument keys 222, each virtual instrument key 222 corresponding to a key on a performance module. The virtual music instrument 210 may be any virtual music instrument contemplated in the art. Some non-limiting examples include: a guitar, a piano and/or piano keyboard, a drum and/or drum set, a saxophone, a violin, and/or so forth. The virtual instrument 210 and/or plurality of virtual instrument keys 222 may be disposed and/or oriented in any manner contemplated in the art. In one embodiment, as shown in FIGS. 6 and 7, the virtual instrument 210 is oriented on the bottom and middle portions of the graphical user interface 600, respectively.

Also, as shown in the figures, the method 300 may include incorporating music data and/or music/metadata values 140 in into the graphical user interface 200 and 600. The music data 140 may contain data corresponding to an arrangement of a plurality of musical notes in sequence, having a rhythmic pattern, and each note being represented by one or more composition objects 220, 230, and 240. The composition objects 220, 230, and 240 may represent, embody, and/or be associated with music performance data, prerecorded music data, and/or any music data contemplated in the art, or described herein. The composition objects 220, 230, and 240 may take any form or shape as contemplated in the art, or as described herein.

Additionally, as shown in the figures, the method 300 may include directing the composition objects 220, 230, and 240 upward on the graphical user interface 200 and 600 in a substantially straight trajectory away from and toward the plurality of virtual instrument keys 222 corresponding to the composition objects' 220, 230, and 240 music value and/or pitch. In being substantially straight, the trajectory may or may not be a straight upward direction, but may veer slightly to the right and/or left. Additionally, the trajectory of the composition objects 220, 230, and 240 may include patterns and/or designed trajectories comprising a variety of angles and/or trajectories configured to challenge and/or entertain one or more player modules and/or users 590.

The method 300, as illustrated in the figures, may additionally include colliding the composition objects 220, 230, and 240 with corresponding virtual instrument keys 222 according to the rhythmic pattern of the arrangement. Additionally, the method 300 may include introducing a series of visible staff lines 670, wherein the visible staff lines 670 correspond to the substantially straight trajectories of the composition objects 220, 230, and 240. In one non-limiting example, a composition object 220, 230, and 240 travels upward along a visible staff line 670 toward the virtual instrument key 222 until the composition object 220, 230, and 240 collides with the corresponding virtual instrument key 222.

In an additional embodiment, the composition object 220, 230, and 240 comprises a musical note which corresponds to a musical note to be played for a music performance and/or on a performance module. The method 300 may include awarding a value to one or more player modules or users 590 based upon the users 590 striking a corresponding key on a musical performance module approximately simultaneously as the composition object 220, 230, and 240 collides with the virtual instrument keys 222. In being "approximately simultaneous", one or more users 590 may or may not strike a corresponding key on his or her performance module at the exact moment a composition object 220, 230, and 240 collides with a virtual instrument key 222. An award value may be awarded to one or more users 590 if the users 590 strike a corresponding key on his or her performance module 250 one or two seconds before and/or after the exact moment a composition object 220, 230, and 240 collides with a virtual instrument key 222.

In an additional embodiment, the meaning of "approximately simultaneous" may be changed and/or set by one or more users 590. The method 300 may include varying the degrees of difficulty which may or may not be changed by one or more users 590. In one non-limiting example, a degree of difficulty may include expert; wherein "approximately simultaneous" means the exact moment a composition object 220, 230, and 240 collides with a virtual instrument key 222. In another non-limiting example, a degree of difficulty may include beginner; wherein "approximately simultaneous" means two seconds before and/or after a composition object 220, 230, and 240 collides with a virtual instrument key 222.

As shown in the figures, the method 300 may include directing the composition objects 220, 230, and 240 upward and away from the virtual instrument keys 222 traveling in a substantially straight trajectory. The method may additionally include pausing and/or freezing the travel of the composition objects 220, 230, and 240. A user 590 or player module may elect to pause and/or freeze the travel of the composition objects 220, 230, and 240. Upon pausing the travel, the method 300 may include editing and/or transposing one more composition objects 220, 230, and 240, the first and second indicators 120 and 130, and/or, indeed, the music/metadata values 140, as described herein. Pausing the travel of the composition objects 220, 230, and 240 may allow a user 590 to edit and/or transpose previously played and/or composed music data. For example, the composed music data, and/or the accompanying prerecorded music data, both would travel outward from the virtual instrument keys 22 after being played or created by a user 590. A user 590 may then pause the travel and then edit, and/or change the recently played and/or created music data embodied in the composition objects 220, 230, and 240. Additionally, the above described music data may be recorded and/or played back to a user 590, as the method 300 previously describes.

Also shown in the figures, the method 300 may include displaying a set characteristic signal 925. The set characteristic includes music data, metadata, and/or music values associated with one or more musical keys; such as, but not limited to, the key of $B^b$ Major, or B Flat Major, $B^b$ Minor, or B Flat Minor. Indeed, the musical key may be any musical key, Minor and/or Major, contemplated in the art. The signal 925 representing and/or signaling the particular musical key may be any type and/or kind of signaling or visual aid contemplated in the art. In one embodiment, the signal 925 is not keyed to include shape signals. In not being keyed to take the form of a shape, the data and/or program code instructing and/or comprising the second indicator 130 does not include shapes. Some non-limiting examples of signals 925 include: highlights, colors shades, color patterns, signal flags, X markings, audio and/or visual aides, messages, alerts, and/or so forth.

Figure 9:
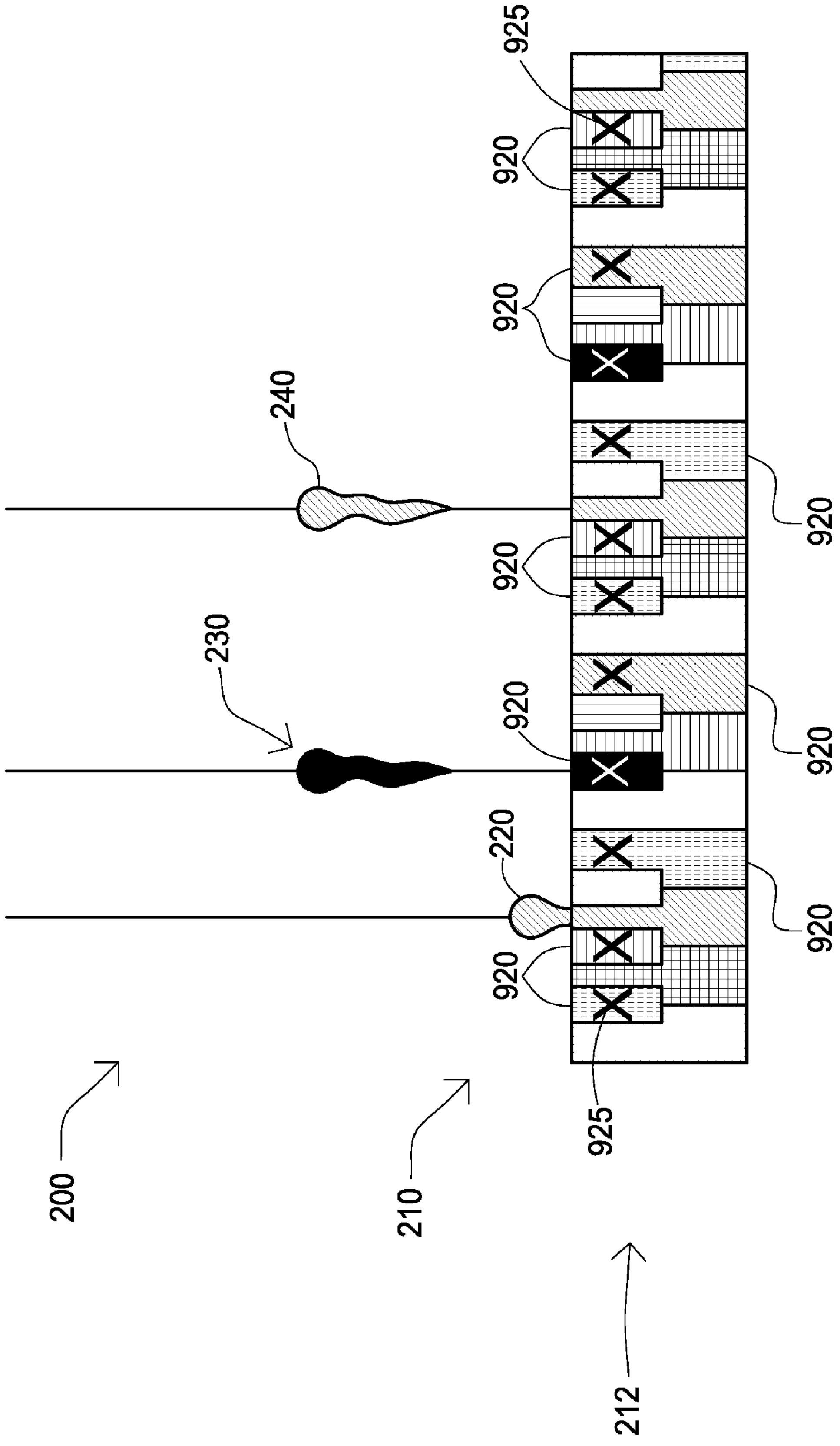
FIG. 9 illustrates an exemplary graphical display, according to one embodiment of the invention.

In one non-limiting example, as shown in FIG. 9, the signal 925 includes markings and/or signals disposed on virtual instrument keys 920 of a virtual musical instrument 210 which are not included in the particular musical key selected by a user 590. For example, a user 590 selects to compose, create, and/or play a musical selection in the key of B Flat Major. Accordingly, the appropriate virtual instrument keys, pitches, and/or music values of the musical key of B Flat major include: $B^b$, C, D, $E^b$, F, G, and A; thus, the signal 925 would mark and/or signal those virtual instrument keys 920 not included in the key of $B^b$ Major. As demonstrated in FIG. 9, the virtual keys B, $C^\#$, D, E, $F^\#$, and $G^\#$ 920, each include a marking or signal 925, signaling those keys are not recommended or appropriate for the key of $B^b$ Major.

In an alternative embodiment, the signal 925 may be embodied, included, and/or disposed on those virtual instrument keys which would be included in a selected musical key, such as but not limited to, $B^b$ Major. In one non-limiting example, those virtual instrument keys 222 included in a selected music key may be highlighted, contain brighter colors, and/or contain a visual and/or audible signal such that a user 590 is aided in which virtual instrument keys 222 are associated with a selected musical key.

In an additional embodiment, the method 300 and program code may be configured to display the set characteristic signal 925 while still allowing for a user 590 to play virtual instrument keys 222 and/or pitches not included in a selected musical key. In one non-limiting example, if a user 590 has selected the key of $B^b$ Major, the signals 925 would signal the inappropriate virtual instrument keys 920 and/or pitches associated with the musical key of $B^b$ Major, but would enable a user 590 freedom to compose with and/or play those inappropriate virtual instrument keys 920 and/or pitches.

Figure 4:
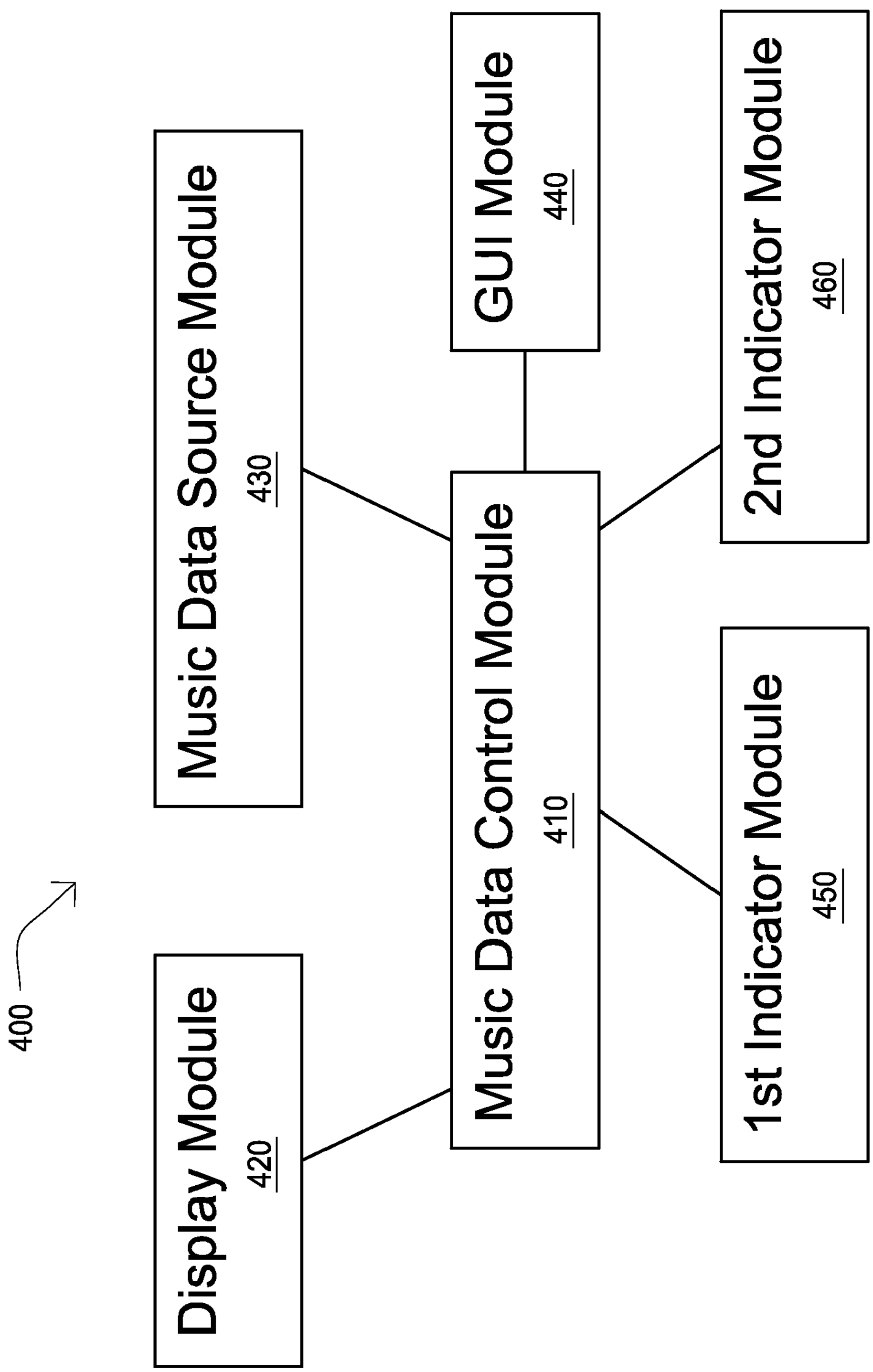
FIG. 4 is a block diagram of a system of musical composition according to one embodiment of the invention.

As shown in FIG. 4, there is a system 400 for music composition comprising: a display module 420 configured to display data; and a graphical user interface module 440 in communication with the music data control module 410, and configured to interface with a user 590. The display module 420 may be any display module 420 contemplated in the art, or as described herein. Some non-limiting examples of display modules 420 include: computer monitors, video cards, video graphic software and engines, and/or so forth. The graphical user interface module 440 may be any graphical user interface (GUI) module 440 contemplated in the art, or as described herein. Some non-limiting examples of GUI modules 440 include: a keyboard, a computer mouse, a joystick, and/or so forth. The display module 420 and GUI module 440 may includes instructions for and/or functions to execute and/or assist in executing the method and program codes as herein described or any manner contemplated in the art.

Also shown in the figures, the system 400 additionally comprises a music data control module 410 in communication with the display module 420 and with the graphical user interface module 440, and configured to control music data and/or music values 140. The music data control module 410 comprises instructions for displaying a composition object 220, 230, and 240 through the display module 420, wherein the composition object 220, 230, and 240 displays a first music value 140 in a first mode and a second music value 140 in a second mode. The first music value 140 and the second music value 140 may be any music value/data/metadata associated with music data as contemplated in art or described herein. Displaying the first music value 140 and the second music value 140 in a first and second mode, respectively, may include displaying the first and second music value 140 in any form or manner contemplated in the art, or as described herein.

Additionally, as shown in the figures, the music data control module 410 may include instructions for displaying the first indicator 120 in association with the composition object 220, 230, and 240, in communication with the graphical user interface module 440. Displaying the first indicator 120 in association with the composition object 220, 230, and 240 may occur in any manner contemplated in the art, or as described herein. In one non-limiting example, displaying the first indicator 120 in association with the composition object 220, 230, and 240 includes displaying the composition object 220, 230, and 240 in a particular position and/or location relative to virtual instrument keys 222 on a virtual instrument 210, wherein the first indicator 120 is the position and/or location of the composition object 220, 230, and 240. Further, the music data control module 410 includes instructions for transitioning the composition object 220, 230, and 240 between the first mode and the second mode. The transition 250 may be accomplished by any means and/or manner contemplated it the art, or as described herein. In one non-limiting example, the transition 250 of the composition object 220, 230, and 240 is actuated between the first mode and the second mode by graphically altering the first indicator 340 through the graphical user interface module 440.

Also shown in the figures, the music data control module 410 includes instructions for displaying a second indicator 130 in association with the composition object 220, 230, and 240. The second indicator 130 may be displayed and/or take any form or shape contemplated in the art, or as described herein. In one non-limiting example, the second indicator 130 is not keyed to take the form of shapes. In not being keyed to take the form of a shape, the data and/or program code instructing and/or comprising the second indicator 130 does not include shapes. Rather, the second indicator 130 may comprise a color. Indeed, the second indicator 130 may comprise any color, pattern, etc. contemplated in the art, or as described herein.

As shown in the figures, the music data control module 410 also includes instructions for graphically changing and/or altering the second indicator 360 in association with the transition 250 of the composition object 220, 230, and 240 between the first mode and the second mode. The graphical change of the second indicator 360 may occur and/or include any graphical change contemplated in the art, or as described herein. In one non-limiting example, the graphical change of the second indicator 360 includes an alteration and/or change of color. In another non-limiting example, the graphical change of the second indicator 360 occurs automatically and substantially simultaneously during the transition 250 of the composition object 220, 230, and 240 between the first mode and the second mode. In occurring substantially simultaneously, the graphical change may occur while the composition object 220, 230, and 240 is being moved from one position to another, or a minimal amount of time after the composition object 220, 230, and 240 has reached the new position.

As shown in the figures, the system 400 also includes a music data source module 430 in communication with the music data control module 410 and providing the first music/metadata value 140. Providing the first music/metadata value 140 may be accomplished in any manner contemplated in the art, or as described herein. In one non-limiting example, wherein the first music/metadata value 140 includes data and/or metadata associated with music pitch, music tone, music tracks, music parts, and/or so forth; the music data source module may include a plurality of prerecorded music data and/or values. The music data source module 430 may additionally include music data associated with prerecorded, predetermined, and/or performed music data, such as performances on a performance module, as previously described. Indeed, the music data source module 430 may provide a plurality of music/metadata values 140.

In another embodiment, predetermined music and/or prerecorded music data may include a song and/or orchestral piece as performed by the original artist or as sung or played by professional musician, or as described herein. Additionally, the music data source module 430 may include instructions for receiving and/or storing all the music data not associated with a player modules' 590 assigned part of a musical composition. In one non-limiting example, the music data source module 430 includes music data in form of mp3, MIDI format, and/or other form that is that is associated with prerecorded, predetermined, and/or performed music data, such as performances on a performance module, as previously described.

In an additional embodiment, the music data source module 430 includes one or more performance modules. The one or more performance modules may include a variety of musical instruments with which one or more users 590 may perform. Some non-limiting examples of musical instruments include: a piano, a piano keyboard, a guitar, drums, a violin, and/or so forth. The performance module or musical instrument may or may not include one or more transducers. The transducers may be any type and/or kind of transducer contemplated in the art which functions to convert a musical performance to musical performance data. In one non-limiting example, the transducer includes a transducer for a stringed instrument or a wind instrument, such as those taught in U.S. Pat. Nos. 6,271,456 and 4,527,456 which are incorporated herein by reference. Additionally, a variety of types and/or kinds of transducers, including Piezo transducers, may be available at www.amazon.com.

In yet another, the music data source module 430 includes an audio module configured to broadcast audio. The audio module may be any component, software, hardware, etc. contemplated in the art which functions and/or assists in broadcasting audio, such as, but not limited to music data and/or music files, in addition to executing the method 300 and functions described herein. Some non-limiting examples include: audio cords, audio speakers, audio software, audio settings, equalizers, and/or so forth. Such systems and/or components are readily available and easily accessible by those skilled in the art.

In still another embodiment, the music data source module 430 includes a performance recording module. The performance recording module may include instructions for recording performance data from one or more performance modules, in addition to executing the method 300 and functions described herein.

Additionally, as shown in the figures, the display module 420 includes a virtual musical instrument 210 having a plurality of virtual instrument keys 222, each virtual instrument key 222 corresponding to a key on a performance module. There also is a plurality of the composition objects 220, 230, and 240 in sequence having a rhythmic pattern associated with music performance data. The plurality of composition objects 220, 230, and 240 may be directed in substantially straight trajectories, toward the virtual instrument keys 222 until the composition objects 220, 230, and 240 are collided with the corresponding virtual instrument keys 222 according to the rhythmic pattern of the musical performance data. The above described features and/or objects may be embodied or displayed in any form contemplated in the art, or as described herein.

Also, as shown in the figures, the display module 420 includes a series of visible staff lines 670, wherein the visible staff lines 670 correspond to the substantially straight trajectories of the composition objects 220, 230, and 240, such that composition objects 220, 230, and 240 travel along the lines 670 until the composition objects 220, 230, and 240 collide with the virtual instrument keys 222. The above described features and/or objects may be embodied or displayed in any form contemplated in the art, or as described herein.

Also, as shown in the figures, the display module 420 may include instructions and/or function to orient the virtual music instrument 210 along the central axis region of the user interface 600, and upon the composition objects' collision with the virtual instrument keys 222, the composition objects 220, 230, and 240 may be directed away from the virtual instrument keys 222 until a pause mode is activated. The pause mode may be embodied in or part of a pause play module, wherein a user 590 may select to pause or freeze play or composition. Indeed, the above described features and/or objects may be embodied or displayed in any form contemplated in the art, or as described herein.

Figure 5:
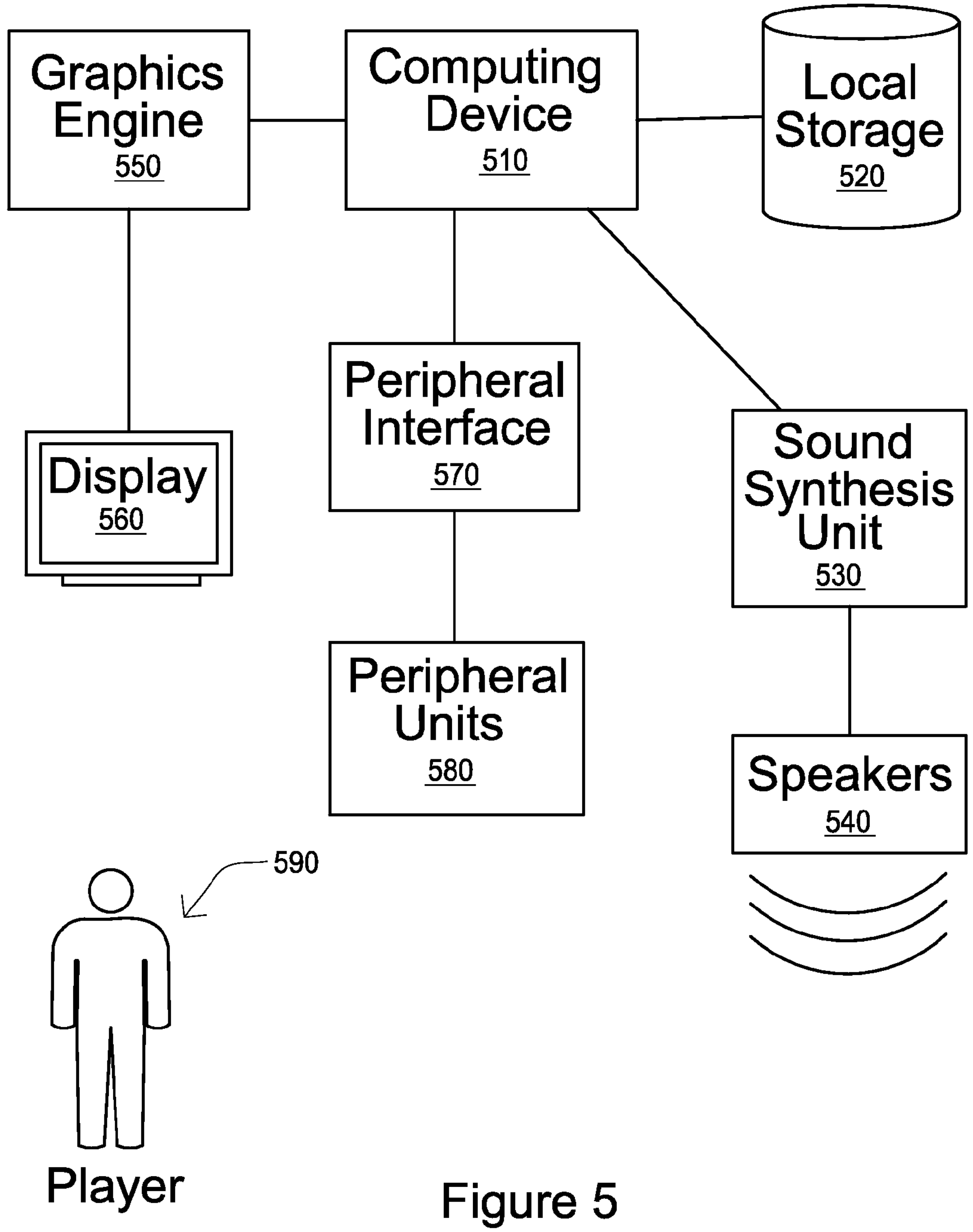
FIG. 5 illustrates a hardware configuration of a system of musical composition according to one embodiment of the invention.

FIG. 5 illustrates an overall hardware configuration of a system of musical composition 400 according to one embodiment of the invention. A computing device 510 manages the overall system. A player, player module, and/or user 590 watch a display module 420 for visual cues, and listens to speakers 540 for audio cues. Based on this feedback, the player 590 uses peripherals 580 to play a rhythm that corresponds to a musical performance being played by a digital processor such as a computing device 510 through a sound synthesis unit 530 and speakers 540. The peripherals 580 provide input to the computing device 510 through a peripheral interface 570. The peripherals 580 may include any type of peripheral input device contemplated in the art, or as described herein. Some non-limiting examples of peripheral input devices 580 include: a computer mouse, a joystick, a musical instrument, a cursor, and/or so forth. Based on player performance information stored on local storage 520 and kept in memory 520, the computing device 510 uses signals from the peripheral interface 570 to drive the generation of musical tones by the sound synthesis unit 530 and play them through speakers 540. The player 590 hears these tones, completing the illusion that he or she has directly created these tones by playing on the peripherals 580. The computing device 510 uses a graphics engine 550 to generate a display 560 to further guide and entertain the player 590. The computing device 510 can be connected to other computing devices performing similar functions through a local area network or a wide area network. It is understood that FIG. 5 is meant to be illustrative, and there are other configurations of computing devices that can be described by one skilled in the art. For example, a multiple processor configuration could be used to drive the system.

FIGS. 6 and 7 illustrate an exemplary embodiment of the invention, wherein the virtual instrument 210, including a plurality of virtual instrument keys 222 are oriented and disposed at the bottom and middle areas of the graphical user interface 600, respectively. The graphical user interface 600 further comprises a plurality of composition objects 220, 230, 240, and 675, each aligned on a trajectory extending toward and/or away from the virtual instrument keys 222. Similar to FIG. 2, the first and second indicators 120 and 130 are each demonstrated by the positions/locations and the colors of the composition objects 220, 230, and 240, respectively. Additionally, as demonstrated through comparing the respective lengths of composition objects 675 and 230, the composition objects may include a third indicator, which represents a music value associated with duration of a note, such as, but not limited to, a half note, whole, quarter note, and/or so forth.

FIGS. 6 and 7 also show there may be one or more icons 635, 640, and 660 disposed on the graphical user interface 600 which may allow a user to select various options and/or settings associated with composing and/or playing music data. The option and/or setting may be any contemplated in the art. Some non-limiting examples include: freezing and/or pausing the menu 620, exiting the song 635, a help icon 655, and/or resume song 660. The graphical user interface 600 may also include a scroll bar 665, wherein a user 590 may view previously played or upcoming music data. Additional examples of options and/or settings include: phrase and/or music data looping and playback, time signature and tempo settings, key signature and music key settings as previously described.

Figure 8:
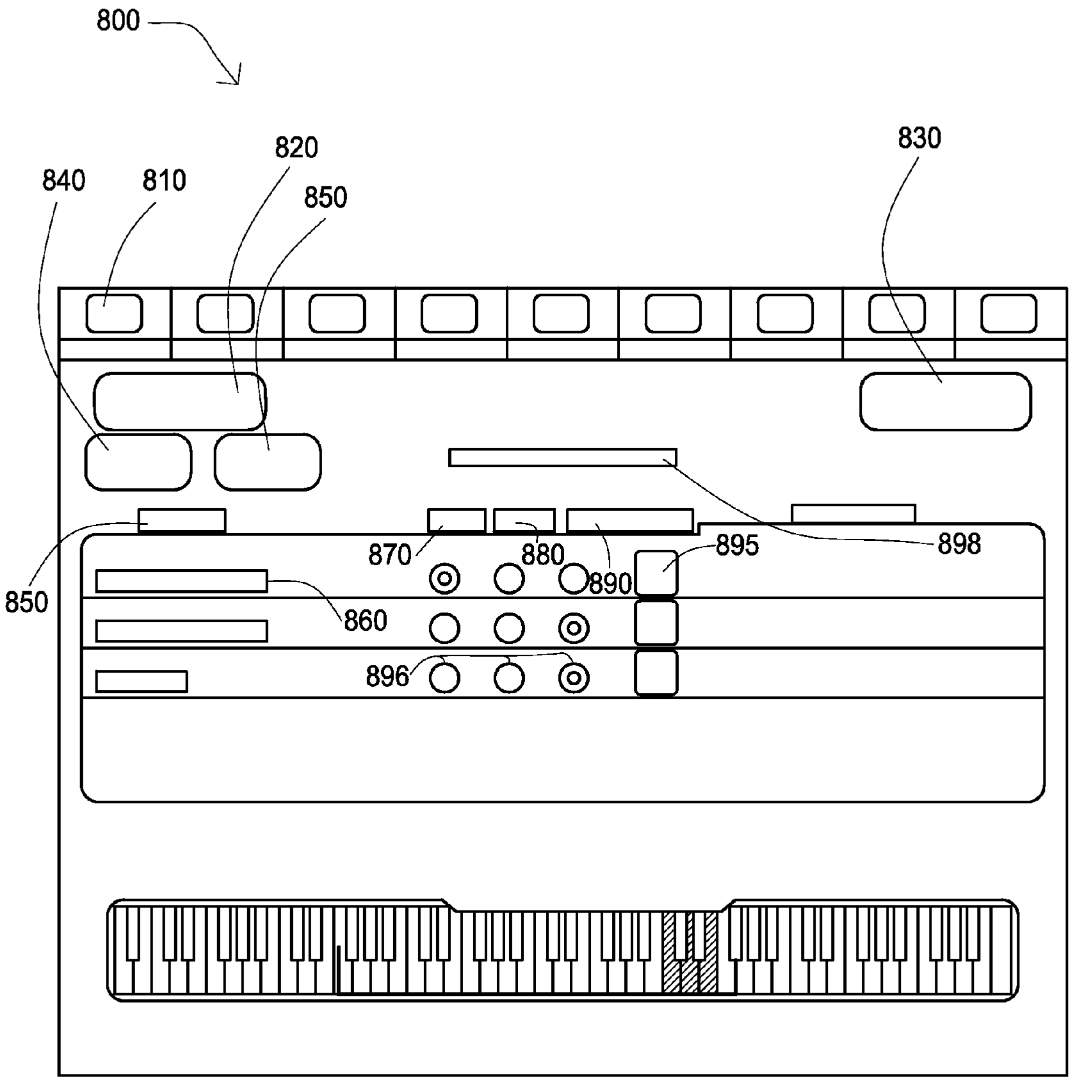
FIG. 8 illustrates an exemplary graphical display, according to one embodiment of the invention.

FIG. 8 illustrates another exemplary display module 420 and/or graphical user interface 800. There are one or more icons 810 which may include instructions for aiding a user 590 in composing and/or playing music data, as herein described. Additionally, the graphical user interface 800 includes a track selection module and/or interface 898. The track selection module and/or interface 898 may include instructions and/or function to enable a user 590 to select one or tracks or parts 860 of a music piece, such as but not limited to, harpsichord, drum, flute, and/or so forth. The track selection module/interface 898 may additionally function and/or include instructions for enabling a user 590 to select whether the user 590 wishes to play the particular part 860, have the part 860 played as accompaniment 890 from prerecorded music data, and/or mute the part 860. Additionally, the track selection interface/module 898 may include one or more instrument icons 895 which display the instrument associated with a particular part 860. Audio data may be associated with each instrument icon 895 such that a user 590 may click or move a cursor over the icon 895 and hear audio data associated with that particular instrument.

As shown by the figures, the system 400 and method 300 provide an easy to understand, yet intuitive and creative way to compose, create, and/or play along with music data. In operation, a user 590 may pause and select one or more composition objects 220, 230, and 240 displayed on the display module 420 and/or graphical user interface 200 and 600. To compose and/or edit the music data, a user 590 simply moves a composition object 220, 230, and 240 from one position, or note, to another note. When one or more composition objects 220, 230, and 240 are transitioning from a first note to a second note, the method 300 and system 400 provide for graphically altering the second indicator 130, or changing the color, simultaneously during the transition 250. The system 400 advantageously allows for those skilled and unskilled to create and edit music compositions. Further, because notes and music data are represented by colors and composition objects 220, 230, and 240, those unskilled or early learners, especially children, may learn at a more rapid and easy pace.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

Additionally, although the figures illustrate a virtual piano keyboard 210, it is contemplated and understood the virtual music instrument 210 may be any musical instrument contemplated in the art. Indeed, a virtual musical instrument of any type may be displayed on the display module 420 and/or graphical user interface 200 with corresponding virtual instrument keys 222. Some non-limiting examples of virtual music instruments 210 include: a guitar, drums, a wind instrument, a brass instrument, a string instrument, and/or so forth.

It is also envisioned that the first and/or second music/metadata values 140 each may represent or include information regarding plurality of musical values, sets, and/or groups of music values. In one non-limiting example, the first music and/or metadata value 140 represents a set of musical values for example a chord, or a plurality of notes, rhythmically and/or tonally connected.

Additionally, it is also envisioned that the first and/or second indicators 120 and 130 and/or set characteristic signal 925 each may represent or include information regarding plurality of musical values, sets, and/or groups of music values. In one non-limiting example, the first and/or second indicators 120 and 130 and/or set characteristic signal 925 represents a set of musical values for example a chord, or a plurality of notes rhythmically or tonally connected.

It is expected that there could be numerous variations of the design of this invention. An example is that the virtual music instrument 210 may be oriented vertically, rather than horizontally, on the display module 420 and/or graphical user interface 200.

Additionally, it is envisioned that one or more users 590 may be in communication through and/or via network. The system 400 and/or method 300 may assist or facilitate music composition and indeed, musical cooperation among a plurality of users 590 communicating over a network.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A method for music composition, comprising:

a) displaying a composition object according to a first value, wherein the first value includes a musical event;

b) displaying a first indicator, wherein the first indicator describes the first value;

c) displaying a second indicator, wherein the second indicator describes the first value;

d) selecting the composition object;

e) graphically altering the first indicator;

f) changing the first value to a second value;

g) graphically altering the second indicator; and h) generating a graphical user interface including a virtual music instrument, wherein the virtual music instrument includes a plurality of virtual keys, each key corresponding to a key on a performance module;

i) incorporating music data in into the graphical user interface, wherein the music data contains data corresponding to an arrangement of a plurality of musical notes in sequence, having a rhythmic pattern, each note being represented by the composition object;

j) directing the composition object in a substantially straight trajectory, toward the virtual keys corresponding to the musical notes; and k) colliding the composition object with corresponding virtual key according to the rhythmic pattern of the arrangement; and l) introducing a series of visible staff lines defining spaces, wherein the lines and spaces correspond to the substantially straight trajectory along which the composition object travels toward the virtual music instrument, such that the composition object travels along the visible staff lines until colliding with the virtual music instrument at the corresponding virtual key.

2. The method of claim 1, wherein first indicator comprises the position of the composition object relative to a displayed virtual instrument.

3. The method of claim 1, wherein the second indicator is not keyed to shapes.

4. The method of claim 3, wherein the second indicator comprises a color.

5. The method of claim 1, further comprising displaying a set characteristic signal.

6. The method of claim 5, wherein the signal is not is not keyed to a set of shapes.

7. A computer readable storage medium comprising computer readable program code configured to execute on a processor for music composition, the program code configured to:

a) display a composition object according to a first value, wherein the first value includes a musical event;

b) display a first indicator, wherein the first indicator describes the first value;

c) display a second indicator, wherein the second indicator describes the first value;

d) select the composition object;

e) graphically alter the first indicator;

f) change the first value to a second value;

g) graphically alter the second indicator; and h) generate a graphical user interface including a virtual music instrument, wherein the virtual music instrument includes a plurality of virtual keys, each key corresponding to a key on a performance module;

i) incorporate music data in into the graphical user interface, wherein the music data contains data corresponding to an arrangement of a plurality of musical notes in sequence, having a rhythmic pattern, each note being represented by the composition object;

j) direct the composition object in a substantially straight trajectory, toward the virtual keys corresponding to the musical notes; and k) collide the composition object with corresponding virtual key according to the rhythmic pattern of the arrangement; and l) introducing a series of visible staff lines defining spaces, wherein the lines and spaces correspond to the substantially straight trajectory along which the composition object travels toward the virtual music instrument, such that the composition object travels along the visible staff lines until colliding with the virtual music instrument at the corresponding virtual key.

8. The computer readable storage medium of claim 7, wherein first indicator comprises the position of the composition object relative to a displayed virtual instrument.

9. The computer readable storage medium of claim 7, wherein the second indicator is not keyed to shapes.

10. The computer readable storage medium of claim 9, wherein the second indicator comprises a color.

11. The computer readable storage medium claim 7, wherein the program code is further configured to display a set characteristic signal.

12. The computer readable storage medium of claim 11, wherein the program code is further configured to not key the signal to a set of shapes.

13. A system for music composition, comprising:

a) a display module configured to display data;

b) a graphical user interface module in communication with the music data control module, and configured to interface with a user;

c) a music data control module in communication with the display module and with the graphical user interface module, and configured to control music data, comprising instructions for:

c1) displaying a composition object through the display module, wherein the composition object displays a first value in a first mode and a second value in a second mode;

c2) displaying a first indicator in association with the composition object, in communication with the graphical user interface module, and wherein a transition of the composition object between the first mode and the second mode is actuated by graphically altering the first indicator through the graphical user interface module; and c3) displaying a second indicator in association with the composition object, wherein a graphical change in the second indicator occurs in association with the transition of the composition object between the first mode and the second mode; and d) a music data source module in communication with the music data control module and providing the first value.

14. The system of claim 13, wherein the first indicator comprises the position of the composition object relative to a displayed virtual instrument.

15. The system of claim 13, wherein the second indicator is not keyed to shapes.

16. The system of claim 15, wherein the second indicator comprises a color.

17. The system of claim 13, wherein the music data control module includes instructions for displaying a set characteristic signal.

18. The system of claim 17, wherein the signal is not keyed to a set of shapes.

19. The system of claim 13, wherein the first indicator comprises the position of the composition object relative to a displayed virtual instrument, the second indicator is not keyed to shapes, and the second indicator comprises a color.

20. The system of claim 19, wherein the music data control module includes instructions for displaying a set characteristic signal, and the signal is not keyed to a set of shapes.

* * * * *